United States Patent
Danskin et al.

(10) Patent No.: US 9,092,170 B1
(45) Date of Patent: Jul. 28, 2015

(54) METHOD AND SYSTEM FOR IMPLEMENTING FRAGMENT OPERATION PROCESSING ACROSS A GRAPHICS BUS INTERCONNECT

(75) Inventors: John M. Danskin, Cranston, RI (US); Anthony Michael Tamasi, Los Gatos, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 920 days.

(21) Appl. No.: 11/253,875

(22) Filed: Oct. 18, 2005

(51) Int. Cl.
*G06F 13/14* (2006.01)
*G06F 15/16* (2006.01)
*G06F 3/12* (2006.01)

(52) U.S. Cl.
CPC .................................... *G06F 3/1229* (2013.01)

(58) Field of Classification Search
USPC ......... 345/422, 501, 502, 503, 506, 520, 522, 345/531, 532, 568, 582; 710/3, 107, 126, 710/128, 129, 131, 132, 305, 306, 310, 316, 710/317; 711/2, 154, 206
See application file for complete search history.

(56) References Cited

U.S. PATENT DOCUMENTS

| | | |
|---|---|---|
| 3,091,657 A | 5/1963 | Stuessel |
| 3,614,740 A | 10/1971 | Delagi et al. |
| 3,940,740 A | 2/1976 | Coontz |
| 3,987,291 A | 10/1976 | Gooding et al. |
| 4,101,960 A | 7/1978 | Stokes et al. |
| 4,541,046 A | 9/1985 | Nagashima et al. |
| 4,566,005 A | 1/1986 | Apperley et al. |
| 4,748,585 A | 5/1988 | Chiarulli et al. |
| 4,885,703 A | 12/1989 | Deering |
| 4,897,717 A | 1/1990 | Hamilton et al. |
| 4,951,220 A | 8/1990 | Ramacher et al. |
| 4,958,303 A | 9/1990 | Assarpour et al. |
| 4,965,716 A | 10/1990 | Sweeney |
| 4,965,751 A | 10/1990 | Thayer et al. |
| 4,985,848 A | 1/1991 | Pfeiffer et al. |
| 4,985,988 A | 1/1991 | Littlebury |
| 5,036,473 A | 7/1991 | Butts et al. |
| 5,040,109 A | 8/1991 | Bowhill et al. |
| 5,047,975 A | 9/1991 | Patti et al. |
| 5,175,828 A | 12/1992 | Hall et al. |
| 5,179,530 A | 1/1993 | Genusov et al. |

(Continued)

FOREIGN PATENT DOCUMENTS

| | | |
|---|---|---|
| JP | 07-101885 | 4/1995 |
| JP | H08-077347 | 3/1996 |

(Continued)

OTHER PUBLICATIONS

Intel, Intel Architecture Software Deveopler's Manual, vol. 1: Basic Architecture 1997 p. 8-1.

(Continued)

*Primary Examiner* — Joni Richer (57) ABSTRACT

A method and system for a cooperative graphics processing across a graphics bus in a computer system. The system includes a bridge coupled to a system memory via a system memory bus and coupled to a graphics processor via the graphics bus. The bridge includes a fragment processor for implementing cooperative graphics processing with the graphics processor coupled to the graphics bus. The fragment processor is configured to implement a plurality of raster operations on graphics data stored in the system memory.

31 Claims, 5 Drawing Sheets

(56) References Cited

U.S. PATENT DOCUMENTS

| | | | |
|---|---|---|---|
| 5,197,130 A | 3/1993 | Chen et al. | |
| 5,210,834 A | 5/1993 | Zurawski et al. | |
| 5,263,136 A | 11/1993 | DeAguiar et al. | |
| 5,276,893 A | 1/1994 | Savaria | |
| 5,327,369 A | 7/1994 | Ashkenazi | |
| 5,357,623 A | 10/1994 | Megory-Cohen | |
| 5,375,223 A | 12/1994 | Meyers et al. | |
| 5,388,206 A | 2/1995 | Poulton et al. | |
| 5,388,245 A | 2/1995 | Wong | |
| 5,392,437 A | 2/1995 | Matter et al. | |
| 5,408,606 A | 4/1995 | Eckart | |
| 5,418,973 A | 5/1995 | Ellis et al. | |
| 5,430,841 A | 7/1995 | Tannenbaum et al. | |
| 5,430,884 A | 7/1995 | Beard et al. | |
| 5,432,905 A | 7/1995 | Hsieh et al. | |
| 5,448,496 A | 9/1995 | Butts et al. | |
| 5,498,975 A | 3/1996 | Cliff et al. | |
| 5,513,144 A | 4/1996 | O'Toole | |
| 5,513,354 A | 4/1996 | Dwork et al. | |
| 5,517,666 A | 5/1996 | Ohtani et al. | |
| 5,522,080 A | 5/1996 | Harney | |
| 5,530,457 A | 6/1996 | Helgeson | |
| 5,560,030 A | 9/1996 | Guttag et al. | |
| 5,561,808 A | 10/1996 | Kuma et al. | |
| 5,574,847 A | 11/1996 | Eckart et al. | |
| 5,574,944 A | 11/1996 | Stager | |
| 5,578,976 A | 11/1996 | Yao | |
| 5,627,988 A | 5/1997 | Oldfield | |
| 5,634,107 A | 5/1997 | Yumoto et al. | |
| 5,638,946 A | 6/1997 | Zavracky | |
| 5,644,753 A | 7/1997 | Ebrahim et al. | |
| 5,649,173 A | 7/1997 | Lentz | |
| 5,666,169 A | 9/1997 | Ohki et al. | |
| 5,682,552 A | 10/1997 | Kuboki et al. | |
| 5,682,554 A | 10/1997 | Harrell | |
| 5,706,478 A | 1/1998 | Dye | |
| 5,754,191 A | 5/1998 | Mills et al. | |
| 5,761,476 A | 6/1998 | Martell | |
| 5,764,243 A | 6/1998 | Baldwin | |
| 5,766,979 A | 6/1998 | Budnaitis | |
| 5,784,590 A | 7/1998 | Cohen et al. | |
| 5,784,640 A | 7/1998 | Asghar et al. | |
| 5,796,974 A | 8/1998 | Goddard et al. | |
| 5,802,574 A | 9/1998 | Atallah et al. | |
| 5,809,524 A | 9/1998 | Singh et al. | |
| 5,812,147 A | 9/1998 | Van Hook et al. | |
| 5,835,788 A | 11/1998 | Blumer et al. | |
| 5,848,254 A | 12/1998 | Hagersten | |
| 5,909,595 A | 6/1999 | Rosenthal et al. | |
| 5,913,218 A | 6/1999 | Carney et al. | |
| 5,920,352 A | 7/1999 | Inoue | |
| 5,925,124 A | 7/1999 | Hilgendorf et al. | |
| 5,940,090 A | 8/1999 | Wilde | |
| 5,940,858 A | 8/1999 | Green | |
| 5,949,410 A | 9/1999 | Fung | |
| 5,950,012 A | 9/1999 | Shiell et al. | |
| 5,956,252 A | 9/1999 | Lau et al. | |
| 5,978,838 A | 11/1999 | Mohamed et al. | |
| 5,996,996 A | 12/1999 | Brunelle | |
| 5,999,199 A | 12/1999 | Larson | |
| 5,999,990 A | 12/1999 | Sharrit et al. | |
| 6,009,454 A | 12/1999 | Dummermuth | |
| 6,016,474 A | 1/2000 | Kim et al. | |
| 6,041,399 A | 3/2000 | Terada et al. | |
| 6,049,672 A | 4/2000 | Shiell et al. | |
| 6,049,870 A | 4/2000 | Greaves | |
| 6,065,131 A | 5/2000 | Andrews et al. | |
| 6,067,262 A | 5/2000 | Irrinki et al. | |
| 6,069,540 A | 5/2000 | Berenz et al. | |
| 6,072,686 A | 6/2000 | Yarbrough | |
| 6,073,158 A | 6/2000 | Nally et al. | |
| 6,092,094 A | 7/2000 | Ireton | |
| 6,094,116 A | 7/2000 | Tai et al. | |
| 6,108,766 A | 8/2000 | Hahn et al. | |
| 6,112,019 A | 8/2000 | Chamdani et al. | |
| 6,131,152 A | 10/2000 | Ang et al. | |
| 6,141,740 A | 10/2000 | Mahalingaiah et al. | |
| 6,144,392 A | 11/2000 | Rogers | |
| 6,150,610 A | 11/2000 | Sutton | |
| 6,189,068 B1 | 2/2001 | Witt et al. | |
| 6,192,073 B1 | 2/2001 | Reader et al. | |
| 6,192,458 B1 | 2/2001 | Arimilli et al. | |
| 6,208,361 B1 | 3/2001 | Gossett | |
| 6,209,078 B1 | 3/2001 | Chiang et al. | |
| 6,219,628 B1 | 4/2001 | Kodosky et al. | |
| 6,222,552 B1 | 4/2001 | Haas et al. | |
| 6,230,254 B1 | 5/2001 | Senter et al. | |
| 6,239,810 B1 | 5/2001 | Van Hook et al. | |
| 6,247,094 B1 | 6/2001 | Kumar et al. | |
| 6,249,288 B1 | 6/2001 | Campbell | |
| 6,252,610 B1 | 6/2001 | Hussain | |
| 6,255,849 B1 | 7/2001 | Mohan | |
| 6,292,886 B1 | 9/2001 | Makineni et al. | |
| 6,301,600 B1 | 10/2001 | Petro et al. | |
| 6,307,169 B1 | 10/2001 | Sun et al. | |
| 6,314,493 B1 | 11/2001 | Luick | |
| 6,317,819 B1 | 11/2001 | Morton | |
| 6,351,808 B1 | 2/2002 | Joy et al. | |
| 6,363,285 B1 | 3/2002 | Wey | |
| 6,363,295 B1 | 3/2002 | Akram et al. | |
| 6,370,617 B1 | 4/2002 | Lu et al. | |
| 6,437,789 B1 | 8/2002 | Tidwell et al. | |
| 6,438,664 B1 | 8/2002 | McGrath et al. | |
| 6,476,808 B1 * | 11/2002 | Kuo et al. | 345/422 |
| 6,480,927 B1 | 11/2002 | Bauman | |
| 6,490,654 B2 | 12/2002 | Wickeraad et al. | |
| 6,496,193 B1 * | 12/2002 | Surti et al. | 345/552 |
| 6,496,902 B1 | 12/2002 | Faanes et al. | |
| 6,499,090 B1 | 12/2002 | Hill et al. | |
| 6,525,737 B1 | 2/2003 | Duluk, Jr. et al. | |
| 6,529,201 B1 | 3/2003 | Ault et al. | |
| 6,545,683 B1 * | 4/2003 | Williams | 345/522 |
| 6,597,357 B1 | 7/2003 | Thomas | |
| 6,603,481 B1 | 8/2003 | Kawai et al. | |
| 6,624,818 B1 | 9/2003 | Mantor et al. | |
| 6,631,423 B1 | 10/2003 | Brown et al. | |
| 6,631,463 B1 | 10/2003 | Floyd et al. | |
| 6,657,635 B1 | 12/2003 | Hutchins et al. | |
| 6,658,447 B2 | 12/2003 | Cota-Robles | |
| 6,674,841 B1 | 1/2004 | Johns et al. | |
| 6,690,381 B1 * | 2/2004 | Hussain et al. | 345/582 |
| 6,700,588 B1 | 3/2004 | MacInnis et al. | |
| 6,715,035 B1 | 3/2004 | Colglazier et al. | |
| 6,732,242 B2 | 5/2004 | Hill et al. | |
| 6,750,870 B2 * | 6/2004 | Olarig | 345/531 |
| 6,809,732 B2 | 10/2004 | Zatz et al. | |
| 6,812,929 B2 | 11/2004 | Lavelle et al. | |
| 6,825,848 B1 | 11/2004 | Fu et al. | |
| 6,839,062 B2 | 1/2005 | Aronson et al. | |
| 6,862,027 B2 | 3/2005 | Andrews et al. | |
| 6,891,543 B2 | 5/2005 | Wyatt | |
| 6,915,385 B1 | 7/2005 | Leasure et al. | |
| 6,944,744 B2 | 9/2005 | Ahmed et al. | |
| 6,952,214 B2 | 10/2005 | Naegle et al. | |
| 6,965,982 B2 | 11/2005 | Nemawarkar | |
| 6,975,324 B1 | 12/2005 | Valmiki et al. | |
| 6,976,126 B2 | 12/2005 | Clegg et al. | |
| 6,978,149 B1 | 12/2005 | Morelli et al. | |
| 6,978,457 B1 | 12/2005 | Johl et al. | |
| 6,981,106 B1 | 12/2005 | Bauman et al. | |
| 6,985,151 B1 | 1/2006 | Bastos et al. | |
| 7,015,909 B1 | 3/2006 | Morgan, III et al. | |
| 7,031,330 B1 | 4/2006 | Bianchini, Jr. | |
| 7,032,097 B2 | 4/2006 | Alexander et al. | |
| 7,035,979 B2 | 4/2006 | Azevedo et al. | |
| 7,148,888 B2 | 12/2006 | Huang | |
| 7,151,544 B2 | 12/2006 | Emberling | |
| 7,154,500 B2 | 12/2006 | Heng et al. | |
| 7,159,212 B2 | 1/2007 | Schenk et al. | |
| 7,185,178 B1 | 2/2007 | Barreh et al. | |
| 7,202,872 B2 | 4/2007 | Paltashev et al. | |
| 7,260,677 B1 | 8/2007 | Vartti et al. | |
| 7,305,540 B1 | 12/2007 | Trivedi et al. | |
| 7,321,787 B2 | 1/2008 | Kim | |

(56) References Cited

U.S. PATENT DOCUMENTS

| | | |
|---|---|---|
| 7,334,110 B1 | 2/2008 | Faanes et al. |
| 7,369,815 B2 | 5/2008 | Kang et al. |
| 7,373,478 B2 | 5/2008 | Yamazaki |
| 7,406,698 B2 | 7/2008 | Richardson |
| 7,412,570 B2 | 8/2008 | Moll et al. |
| 7,486,290 B1 | 2/2009 | Kilgariff et al. |
| 7,487,305 B2 | 2/2009 | Hill et al. |
| 7,493,452 B2 | 2/2009 | Eichenberger et al. |
| 7,545,381 B2 | 6/2009 | Huang et al. |
| 7,564,460 B2 | 7/2009 | Boland et al. |
| 7,750,913 B1 | 7/2010 | Parenteau et al. |
| 7,777,748 B2 | 8/2010 | Bakalash et al. |
| 7,852,341 B1 | 12/2010 | Rouet et al. |
| 7,869,835 B1 | 1/2011 | Zu |
| 8,020,169 B2 | 9/2011 | Yamasaki |
| 8,416,251 B2 | 4/2013 | Gadre et al. |
| 8,424,012 B1 | 4/2013 | Karandikar et al. |
| 8,493,396 B2 | 7/2013 | Karandikar et al. |
| 8,493,397 B1 | 7/2013 | Su et al. |
| 8,683,184 B1 | 3/2014 | Lew et al. |
| 8,687,008 B2 | 4/2014 | Karandikar et al. |
| 8,698,817 B2 | 4/2014 | Gadre et al. |
| 8,711,161 B1 | 4/2014 | Scotzniovsky et al. |
| 8,725,990 B1 | 5/2014 | Karandikar et al. |
| 8,736,623 B1 | 5/2014 | Lew et al. |
| 8,738,891 B1 | 5/2014 | Karandikar et al. |
| 2001/0026647 A1 | 10/2001 | Morita |
| 2002/0005729 A1 | 1/2002 | Leedy |
| 2002/0026623 A1 | 2/2002 | Morooka |
| 2002/0031025 A1 | 3/2002 | Shimano et al. |
| 2002/0085000 A1* | 7/2002 | Sullivan et al. ............... 345/422 |
| 2002/0087833 A1 | 7/2002 | Burns et al. |
| 2002/0116595 A1 | 8/2002 | Morton |
| 2002/0130874 A1 | 9/2002 | Baldwin |
| 2002/0144061 A1 | 10/2002 | Faanes et al. |
| 2002/0158869 A1 | 10/2002 | Ohba et al. |
| 2002/0194430 A1 | 12/2002 | Cho |
| 2003/0001847 A1 | 1/2003 | Doyle et al. |
| 2003/0001857 A1* | 1/2003 | Doyle ........................ 345/582 |
| 2003/0003943 A1 | 1/2003 | Bajikar |
| 2003/0014457 A1 | 1/2003 | Desai et al. |
| 2003/0016217 A1 | 1/2003 | Vlachos et al. |
| 2003/0016844 A1 | 1/2003 | Numaoka |
| 2003/0020173 A1 | 1/2003 | Huff et al. |
| 2003/0031258 A1 | 2/2003 | Wang et al. |
| 2003/0051091 A1 | 3/2003 | Leung et al. |
| 2003/0061409 A1 | 3/2003 | RuDusky |
| 2003/0067473 A1 | 4/2003 | Taylor et al. |
| 2003/0080963 A1* | 5/2003 | Van Hook et al. ............ 345/501 |
| 2003/0093506 A1 | 5/2003 | Oliver et al. |
| 2003/0115500 A1 | 6/2003 | Akrout et al. |
| 2003/0169269 A1* | 9/2003 | Sasaki et al. ................. 345/581 |
| 2003/0172326 A1 | 9/2003 | Coffin, III et al. |
| 2003/0188118 A1 | 10/2003 | Jackson |
| 2003/0204673 A1 | 10/2003 | Venkumahanti et al. |
| 2003/0204680 A1 | 10/2003 | Hardage, Jr. |
| 2003/0227461 A1 | 12/2003 | Hux et al. |
| 2004/0012597 A1 | 1/2004 | Zatz et al. |
| 2004/0073771 A1 | 4/2004 | Chen et al. |
| 2004/0073773 A1 | 4/2004 | Demjanenko |
| 2004/0103253 A1 | 5/2004 | Kamei et al. |
| 2004/0193837 A1 | 9/2004 | Devaney et al. |
| 2004/0205281 A1* | 10/2004 | Lin et al. ....................... 710/306 |
| 2004/0205326 A1 | 10/2004 | Sindagi et al. |
| 2004/0212730 A1 | 10/2004 | MacInnis et al. |
| 2004/0215887 A1 | 10/2004 | Starke |
| 2004/0221117 A1 | 11/2004 | Shelor |
| 2004/0263519 A1 | 12/2004 | Andrews et al. |
| 2005/0012749 A1* | 1/2005 | Gonzalez et al. ............. 345/522 |
| 2005/0012759 A1 | 1/2005 | Valmiki et al. |
| 2005/0024369 A1 | 2/2005 | Xie |
| 2005/0060601 A1 | 3/2005 | Gomm |
| 2005/0071722 A1 | 3/2005 | Biles |
| 2005/0088448 A1 | 4/2005 | Hussain et al. |
| 2005/0140682 A1* | 6/2005 | Sumanaweera et al. ...... 345/506 |
| 2005/0239518 A1 | 10/2005 | D'Agostino et al. |
| 2005/0262332 A1 | 11/2005 | Rappoport et al. |
| 2005/0280652 A1 | 12/2005 | Hutchins et al. |
| 2006/0020843 A1 | 1/2006 | Frodsham et al. |
| 2006/0064517 A1 | 3/2006 | Oliver |
| 2006/0064547 A1 | 3/2006 | Kottapalli et al. |
| 2006/0103659 A1 | 5/2006 | Karandikar et al. |
| 2006/0152519 A1 | 7/2006 | Hutchins et al. |
| 2006/0152520 A1 | 7/2006 | Gadre et al. |
| 2006/0176308 A1 | 8/2006 | Karandikar et al. |
| 2006/0176309 A1 | 8/2006 | Gadre et al. |
| 2007/0076010 A1 | 4/2007 | Swamy et al. |
| 2007/0130444 A1 | 6/2007 | Mitu et al. |
| 2007/0285427 A1 | 12/2007 | Morein et al. |
| 2008/0016327 A1 | 1/2008 | Menon et al. |
| 2008/0278509 A1 | 11/2008 | Washizu et al. |
| 2009/0235051 A1 | 9/2009 | Codrescu et al. |
| 2012/0023149 A1 | 1/2012 | Kinsman et al. |

FOREIGN PATENT DOCUMENTS

| | | |
|---|---|---|
| JP | H08-153032 | 6/1996 |
| JP | 08-297605 | 12/1996 |
| JP | 09-287217 | 10/1997 |
| JP | 09-287217 | 11/1997 |
| JP | H09-325759 | 12/1997 |
| JP | 10-222476 | 8/1998 |
| JP | 11-190447 | 7/1999 |
| JP | 2000-148695 | 5/2000 |
| JP | 2001-022638 | 1/2001 |
| JP | 2003-178294 | 6/2003 |
| JP | 2004-252990 | 9/2004 |
| KR | 1998-018215 | 8/2000 |
| TW | 413766 | 12/2000 |
| TW | 436710 | 5/2001 |
| TW | 442734 | 6/2001 |
| TW | 093127712 | 7/2005 |

OTHER PUBLICATIONS

Intel, Intel Architecture Software Deveopler's Manual, vol. 1: Basic Architecture 1999 p. 8-1, 9-1.

Intel, Pentium Processor Family Developer's Manual, 1997, pp. 2-13.

Fisher, Joseph A., Very Long Instruction Word Architecture and the ELI-512, ACM, 1993, pp. 140-150.

Hamacher, V. Carl et al., Computer Organization, Second Edition, McGraw Hill, 1984, pp. 1-9.

Kozyrakis, "A Media enhanced vector architecture for embedded memory systems," Jul. 1999, http://digitalassets.lib.berkeley.edu/techreports/ucb/text/CSD-99-1059.pdf.

Brown, Brian; "Data Structure And Number Systems"; 2000; http://www.ibilce.unesp.br/courseware/datas/data3.htm.

"Alpha Testing State"; http://msdn.microsoft.com/library/en-us/directx9_c/directx/graphics/programmingguide/GettingStarted/Direct3Kdevices/States/renderstates/alphatestingstate.asp.

"Anti-aliasing"; http://en.wikipedia.org/wiki/Anti-aliasing.

"Vertex Fog"; http://msdn.microsoft.com/library/en-us/directx9_c/Vertex_fog.asp?frame=true.

NVIDIA Corporation, Technical Brief: Transform and Lighting; dated 1999; month unknown.

Graham, Susan L. et al., Getting Up to Speed: The future of Supercomputing, the National Academies Press, 2005, glossary.

Rosenberg, Jerry M., Dictionary of Computers, Information Processing & Telecommunications, 2nd Edition, John Wiley & Sons, 1987, pp. 102 and 338 (NVID-P001502).

Rosenberg, Jerry M., Dictionary of Computers, Information Processing & Telecommunications, 2nd Edition, John Wiley & Sons, 1987, pp. 305.

Graf, Rudolf F., Modern Dictionary of Electronics, Howard W. Sams & Company, 1988, pp. 273.

Graf, Rudolf F., Modern Dictionary of Electronics, Howard W. Sams & Company, 1984, pp. 566.

Graston et al. (Software Pipelining Irregular Loops On the TMS320C6000 VLIW DSP Architecture); Proceedings of the ACM SIGPLAN workshop on Languages, compilers and tools for embedded systems; pp. 138-144; Year of Publication: 2001.

(56) References Cited

OTHER PUBLICATIONS

Duca et al., A Relational Debugging Engine for Graphics Pipeline, International Conference on Computer Graphics and Interactive Techniques, ACM SIGGRAPH 2005, pp. 453-463, ISSN:0730-0301.
Gadre, S., Patent Application Entitled "Video Processor Having Scalar and Vector Components with Command FIFO for Passing Function Calls from Scalar to Vector", U.S. Appl. No. 11/267,700, filed Nov. 4, 2005.
Gadre, S., Patent Application Entitled "Stream Processing in a Video Processor", U.S. Appl. No. 11/267,599, filed Nov. 4, 2005.
Karandikar et al., Patent Application Entitled: "Multidemnsional Datapath Processing in a Video Processor", U.S. Appl. No. 11/267,638, filed Nov. 4, 2005.
Karandikar et al., Patent Application Entitled: "A Latency Tolerant System for Executing Video Processing Operations", U.S. Appl. No. 11/267,875, filed Nov. 4, 2005.
Gadre, S., Patent Application Entitled "Separately Schedulable Condition Codes For a Video Processor", U.S. Appl. No. 11/267,793, filed Nov. 4, 2005.
Lew, et al., Patent Application Entitled "A Programmable DMA Engine for Implementing Memory Transfers for a Video Processor", U.S. Appl. No. 11/267,777, filed Nov. 4, 2005.
Karandikar et al., Patent Application Entitled: "A Pipelined L2 Cache for Memory Transfers for a Video Processor", U.S. Appl. No. 11/267,606, filed Nov. 4, 2005.
Karandikar, et al., Patent Application Entitled: "Command Acceleration in a Video Processor", U.S. Appl. No. 11/267,640, filed Nov. 4, 2005.
Karandikar, et al., Patent Application Entitled "A Configurable SIMD Engine in a Video Processor", U.S. Appl. No. 11/267,393, filed Nov. 4, 2005.
Karandikar, et al., Patent Application Entitled "Context Switching on a Video Processor Having a Scalar Execution Unit and a Vector Execution Unit", U.S. Appl. No. 11/267,778, filed Nov. 4, 2005.
Lew, et al., Patent Application Entitled "Multi Context Execution on a Video Processor", U.S. Appl. No. 11/267,780, filed Nov. 4, 2005.
Su, Z, et al., Patent Application Entitled: "State Machine Control for a Pipelined L2 Cache to Implement Memory Transfers for a Video Processor", U.S. Appl. No. 11/267,119, filed Nov. 4, 2005.
Free On-Line Dictionary of Computing (FOLDOC), defintion of "video", from foldoc.org/index.cgi?query=video&action=Search, May 23, 2008.
FOLDOC, definition of "frame buffer", from foldoc.org/index.cgi?query=frame+buffer&action=Search, Oct. 3, 1997.
FOLDOC, definition of "motherboard", from foldoc.org/index.cgi?query=motherboard&action=Search, Aug. 10, 2000.
FOLDOC, definition of "separate compilation", from foldoc.org/index.cgi?query=separate+compilation&action=Search, Feb. 19, 2005.
FOLDOC, definition of "vector processor", http://foldoc.org/, Sep. 11, 2003.
FOLDOC (Free On-Line Dictionary of Computing), defintion of X86, Feb. 27, 2004.
FOLDOC, definition of "superscalar," http://foldoc.org/, Jun. 22, 2009.
FOLDOC, definition of Pentium, Sep. 30, 2003.
Wikipedia, definition of "scalar processor," Apr. 4, 2009.
Wikipedia, entry page defining term "SIMD", last modified Mar. 17, 2007.
FOLDOC, Free Online Dictionary of Computing, defintion of SIMD, foldoc.org/index.cgi?query=simd&action=Search, Nov. 4, 1994.
Definition of "queue" from Free on-Line Dictionary of Computing (FOLDOC), http://folddoc.org/index.cgi?query=queue&action=Search, May 15, 2007.
Definition of "first-in first-out" from FOLDOC, http://foldoc.org/index.cgi?query=fifo&action=Search, Dec. 6, 1999.
Definition of "block" from FOLDOC, http://foldoc.org/index.cgi?block, Sep. 23, 2004.
Wikipedia, definition of Multiplication, accessed from en.wikipedia.org/w/index.php?title=Multiplication&oldid=1890974, published Oct. 13, 2003.
Graham, Susan L. et al., Getting Up to Speed: The future of Supercomputing, the National Academies Press, 2005, glossary, Feb. 2005.
Rosenberg, Jerry M., Dictionary of Computers, Information Processing & Telecommunications, 2nd Edition, John Wiley & Sons, 1987, pp. 102 and 338 (NVID-P001502), Dec. 1987.
Rosenberg, Jerry M., Dictionary of Computers, Information Processing & Telecommunications, 2nd Edition, John Wiley & Sons, 1987, pp. 305, Dec. 1987.
Graf, Rudolf F., Modern Dictionary of Electronics, Howard W. Sams & Company, 1988, pp. 273, Dec. 1988.
Graf, Rudolf F., Modern Dictionary of Electronics, Howard W. Sams & Company, 1984, pp. 566, Dec. 1988.
Wikipeida, definition of "subroutine", published Nov. 29, 2003, four pages.
Graston et al. (Software Pipelining Irregular Loops On the TMS320C6000 VLIW DSP Architecture); Proceedings of the ACM SIGPLAN workshop on Languages, compilers and tools for embedded systems; pp. 138-144; Year of Publication: 2001, Oct. 2001.
SearchStorage.com Definitions, "Pipeline Burst Cache," Jul. 31, 2001, url: http://searchstorage.techtarget.com/sDefinition/0,,sid5_gci214414,00.html.
Parhami, Behrooz, Computer Arithmetic: Algorithms and Hardware Designs, Oxford University Press, Jun. 2000, pp. 413-418.
gDEBugger, graphicRemedy, http://www.gremedy.com, Aug. 8, 2006.
Duca et al., A Relational Debugging Engine for Graphics Pipeline, International Conference on Computer Graphics and Interactive Techniques, ACM SIGGRAPH 2005, pp. 453-463, ISSN:0730-0301, Jul. 2005.
Merriam-Webster Dictionary Online; Definition for "program"; retrieved Dec. 14, 2010.
Intel, Intel Architecture Software Deveopler's Manual, vol. 1: Basic Architecture 1997 p. 8-1, Jan. 1997.
Intel, Intel Architecture Software Deveopler's Manual, vol. 1: Basic Architecture 1999 p. 8-1, 9-1, May 1999.
Intel, Intel Pentium III Xeon Processor at 500 and 550Mhz, Feb. 1999.
Intel, Intel MMX Technology at a Glance, Jun. 1997.
Intel, Pentium Processor Family Developer's Manual, 1997, pp. 2-13, Oct. 199.
Intel, Pentium processor with MMX Technology at 233Mhz Performance Brief, Jan. 1998, pp. 3 and 8.
PCreview, article entitled "What is a Motherboard", from www.pcreview.co.uk/articles/Hardware/What_is_a_Motherboard., Nov. 22, 2005.
Wikipedia, defintion of "vector processor", http://en.wikipedia.org/, May 14, 2007.
Fisher, Joseph A., Very Long Instruction Word Architecture and the ELI-512, ACM, 1993, pp. 140-150, Jun. 1993.
Quinnell, Richard A. "New DSP Architectures Go "Post-Harvard" for Higher Performance and Flexibility" Techonline; posted May 1, 2002.
IBM TDB, Device Queue Management, vol. 31 Iss. 10, pp. 45-50, Mar. 1, 1989.
Hamacher, V. Carl et al., Computer Organization, Second Edition, McGraw Hill, 1984, pp. 1-9, May 1984.
Kozyrakis, "A Media enhanced vector architecture for embedded memory systems," Jul. 1999, http://digitalassets.lib.berkeley.edu/techreports/ucb/text/CSD-99/1059.pdf.
HPL-PD A Parameterized Research Approach—May 31, 2004 http://web.archive.org/web/*/www.trimaran.org/docs/5_hpl-pd.pdf.
Hutchins E., SC10: A Video Processor And Pixel-Shading GPU for Handheld Devices; presented at the Hot Chips conferences on Aug. 23, 2004.

(56) References Cited

OTHER PUBLICATIONS

Brown, Brian; "Data Structure And Number Systems"; 2000; http://www.ibilce.unesp.br/courseware/datas/data3.htm, Mar. 2000.

"Alpha Testing State"; http://msdn.microsoft.com/library/en-us/directx9_c/directx/graphics/programmingguide/GettingStarted/Direct3Kdevices/States/renderstates/alphatestingstate.asp, Sep. 2004.

"Anti-aliasing"; http://en.wikipedia.org/wiki/Anti-aliasing, Mar. 2004.

"Vertex Fog"; http://msdn.microsoft.com/library/en-us/directx9_c/Vertex_fog.asp?frame=true, Apr. 2008.

Wilson D., NVIDIA's Tiny 90nm G71 and G73: GeForce 7900 and 7600 Debut; at http://www.anandtech.com/show/1967/2; dated Sep. 3, 2006, retrieved Jun. 16, 2011.

Woods J., Nvidia GeForce FX Preview, at http://www.tweak3d.net/reviews/nvidia/nv30preview/1.shtml; dated Nov. 18, 2002; retrieved Jun. 16, 2011.

NVIDIA Corporation, Technical Brief: Transform and Lighting; dated 1999; month unknown, Apr. 1999.

* cited by examiner

METHOD AND SYSTEM FOR IMPLEMENTING FRAGMENT OPERATION PROCESSING ACROSS A GRAPHICS BUS INTERCONNECT

FIELD OF THE INVENTION

The present invention is generally related to graphics computer systems.

BACKGROUND OF THE INVENTION

Generally, a computer system suited to handle 3D image data includes a specialized graphics processor unit, or GPU, in addition to a traditional CPU (central processing unit). The GPU includes specialized hardware configured to handle 3D computer-generated objects. The GPU is configured to operate on a set of data models and their constituent "primitives" (usually mathematically described polygons) that define the shapes, positions, and attributes of the objects. The hardware of the GPU processes the objects, implementing the calculations required to produce realistic 3D images on a display of the computer system.

The performance of a typical graphics rendering process is highly dependent upon the performance of the system's underlying hardware. High performance real-time graphics rendering requires high data transfer bandwidth to the memory storing the 3D object data and the constituent primitives. Thus, more expensive prior art GPU subsystems (e.g., GPU equipped graphics cards) typically include larger (e.g., 128 MB or larger) specialized, expensive, high bandwidth local graphics memories for feeding the required data to the GPU. Less expensive prior art GPU subsystems include smaller (e.g., 64 MB or less) such local graphics memories, and some of the least expensive GPU subsystems have no local graphics memory.

A problem with the prior art low-cost GPU subsystems (e.g., having smaller amounts of local graphics memory) is the fact that the data transfer bandwidth to the system memory, or main memory, of a computer system is much less than the data transfer bandwidth to the local graphics memory. Typical GPUs with any amount of local graphics memory need to read command streams and scene descriptions from system memory. A GPU subsystem with a small or absent local graphics memory also needs to communicate with system memory in order to access and update pixel data including pixels representing images which the GPU is constructing. This communication occurs across a graphics bus, or the bus that connects the graphics subsystem to the CPU and system memory.

In one example, per-pixel Z-depth data is read across the system bus and compared with a computed value for each pixel to be rendered. For all pixels which have a computed Z value less than the Z value read from system memory, the computed Z value and the computed pixel color value are written to system memory. In another example, pixel colors are read from system memory and blended with computed pixel colors to produce translucency effects before being written to system memory. Higher resolution images (images with a greater number of pixels) require more system memory bandwidth to render. Images representing larger numbers of 3D objects require more system memory bandwidth to render. The low data transfer bandwidth of the graphics bus acts as a bottleneck on overall graphics rendering performance.

Thus, what is required is a solution capable of reducing the limitations imposed by the limited data transfer bandwidth of a graphics bus of a computer system. What is required is a solution that ameliorates the bottleneck imposed by the much smaller data transfer bandwidth of the graphics bus in comparison to the data transfer bandwidth of the GPU to local graphics memory. The present invention provides a novel solution to the above requirement.

SUMMARY OF THE INVENTION

Embodiments of the present invention ameliorate the bottleneck imposed by the much smaller data transfer bandwidth of the graphics bus in comparison to the data transfer bandwidth of the GPU to local graphics memory.

In one embodiment, the present invention is implemented as a system for cooperative graphics processing across a graphics bus in a computer system. The system includes a bridge coupled to a system memory via a system memory bus. The bridge is also coupled to a GPU (graphics processor unit) via the graphics bus. The bridge includes a fragment processor for implementing cooperative graphics processing with the GPU coupled to the graphics bus. The fragment processor is configured to implement a plurality of raster operations on graphics data stored in the system memory. The graphics bus interconnect coupling the bridge to the GPU to can be an AGP-based interconnect or a PCI Express-based interconnect. The GPU can be an add-in card-based GPU or can be a discrete integrated circuit device mounted (e.g., surface mounted, etc.) on the same printed circuit board (e.g., motherboard) as the bridge.

In one embodiment, the graphics data stored in the system memory comprises a frame buffer used by both the fragment processor and the GPU. One mode of cooperative graphics processing involves the fragment processor implementing frame buffer blending on the graphics data in the system memory (e.g., the frame buffer). In one embodiment, the fragment processor is configured to implement multi-sample expansion on graphics data received from the GPU and store the resulting expanded data in the system memory frame buffer. In one embodiment, the fragment processor is configured to evaluate a Z plane equation coverage value for a plurality of pixels (e.g., per polygon) stored in the system memory, wherein the Z plane equation coverage value is received from the GPU via the graphics bus.

In this manner, embodiments of the present invention implement a much more efficient use of the limited data transfer bandwidth of the graphics bus interconnect, and thus dramatically improve overall graphics rendering performance in comparison to the prior art. Furthermore, the benefits provided by the embodiments of the present invention are even more evident in those architectures which primarily utilize system memory for frame buffer graphics data storage.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.
Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

Figure 1:
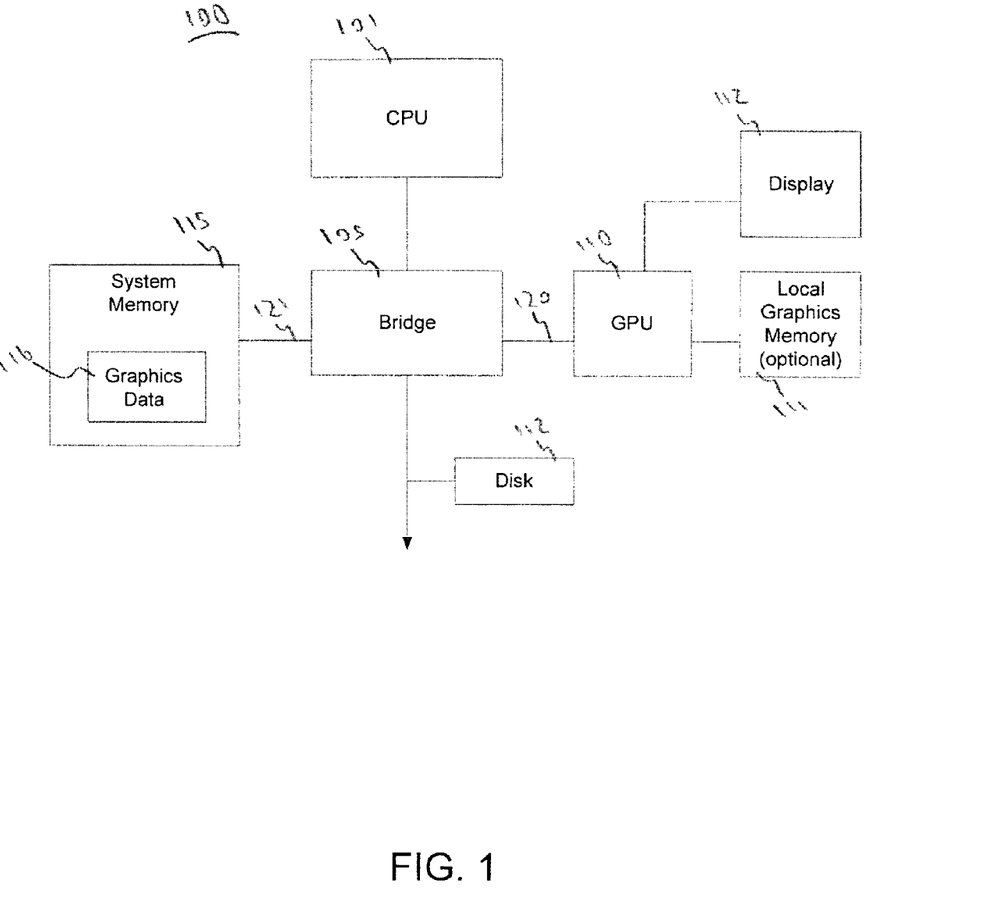
FIG. 1 shows a computer system in accordance with one embodiment of the present invention.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.
Computer System Platform:

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via the bridge component 105 or can be directly coupled to the system memory 115 via a memory controller internal to the CPU 101. The GPU 110 is coupled to a display 112. System 100 can be implemented as, for example, a desktop computer system or server computer system, having a powerful general-purpose CPU 101 coupled to a dedicated graphics rendering GPU 110. In such an embodiment, components would be included that are designed to add peripheral buses, specialized graphics memory, JO devices (e.g., disk drive 112), and the like. The bridge component 105 also supports expansion buses coupling the disk drive 112.

It should be appreciated that although the GPU 110 is depicted in FIG. 1 as a discrete component, the GPU 110 can be implemented as a discrete graphics card designed to couple to the computer system via a graphics bus connection (e.g., AGP, PCI Express, etc.), as a discrete integrated circuit die (e.g., mounted directly on the motherboard), or as an integrated GPU included within the integrated circuit die of a computer system chipset component (e.g., integrated within the bridge chip 105). Additionally, a local graphics memory 111 can optionally be included for the GPU 110 for high bandwidth graphics data storage. It also should be noted that although the bridge component 105 is depicted as a discrete component, the bridge component 105 can be implemented as an integrated controller within a different component (e.g., within the CPU 101, GPU 110, etc.) of the computer system 100. Similarly, system 100 can be implemented as a set-top video game console device such as, for example, the Xbox®, available from Microsoft Corporation of Redmond, Wash.

EMBODIMENTS OF THE PRESENT INVENTION

Figure 2:
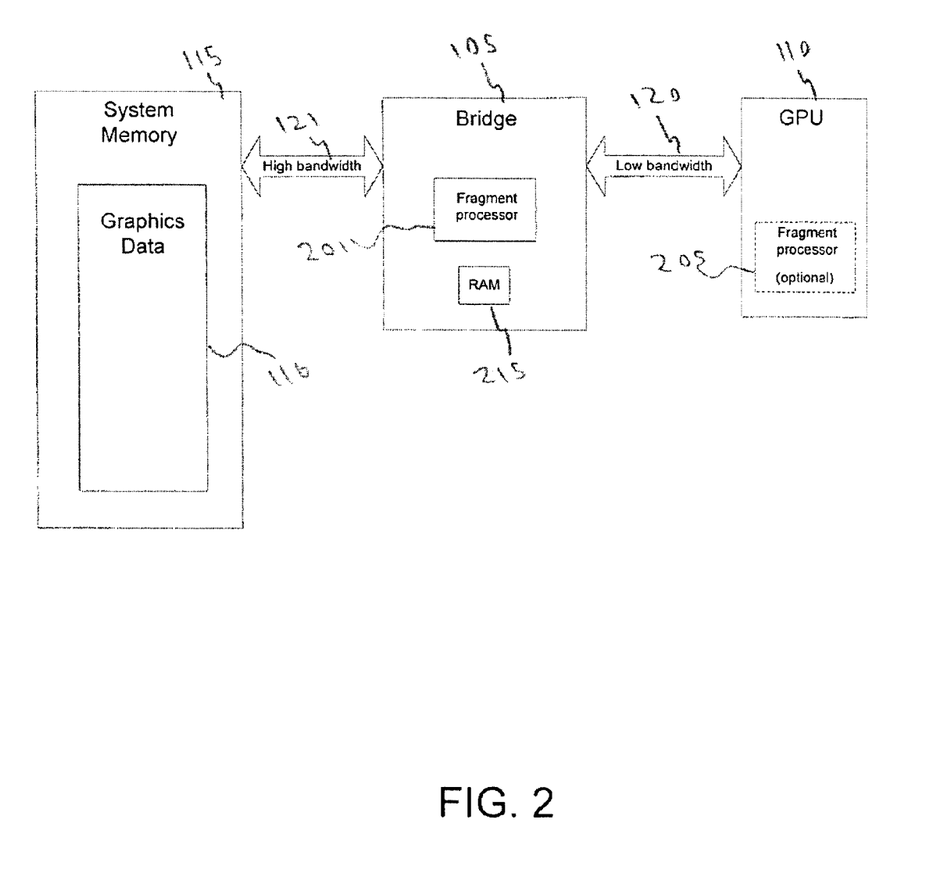
FIG. 2 shows a diagram depicting fragment operation processing as implemented by a computer system in accordance with one embodiment of the present invention.

Referring still to FIG. 1, embodiments of the present invention reduce constraints imposed by the limited data transfer bandwidth of a graphics bus (e.g., graphics bus 120) of a computer system. Embodiments of the present invention ameliorate the bottleneck imposed by the much smaller data transfer bandwidth of the graphics bus 120 in comparison to the data transfer bandwidth of the system memory bus 121 to system memory 115. This is accomplished in part by the bridge 105 implemented cooperative graphics processing in conjunction with the GPU 110 to reduce the amount data that must be transferred across the graphics bus 120 during graphics rendering operations. As shown FIG. 1, the bridge component 105 is a core logic chipset component that provides core logic functions for the computer system 100.

The cooperative graphics processing reduces the total amount data that must be transferred across the bandwidth constrained graphics bus 120. By performing certain graphics rendering operations within the bridge component 105, the comparatively high bandwidth system memory bus 121 can be used to access to graphics data 116, reducing the amount of data access latency experienced by these rendering operations. The resulting reduction in access latency, and increase in transfer bandwidth, allows the overall graphics rendering operations to proceed more efficiently, thereby increasing the performance of bandwidth-demanding 3D rendering applications. This cooperative graphics rendering process is described in further detail in FIG. 2 below.

FIG. 2 shows a diagram depicting a fragment operation processing process in accordance with one embodiment of the present invention. As depicted in FIG. 2, the GPU 110 is coupled to the bridge 105 via the low bandwidth graphics bus 120. The bridge 105 is further coupled to the system memory 115 via the high bandwidth system memory bus 121. FIG. 2 depicts a configuration whereby system memory 115 is used as frame buffer memory (e.g., graphics data 116) for the computer system (as opposed to a local graphics memory). The bridge 105 is configured to access to graphics data 116 via the high bandwidth system memory bus 121. The bridge 105 is also coupled to the GPU 110 via the graphics bus 120.

The bridge 105 includes a fragment processor 201 for implementing cooperative graphics processing with the GPU 110. The fragment processor 201 is configured to implement a plurality of raster operations on graphics data stored in the system memory. These raster operations executed by the fragment processor 201 suffer a much lower degree of latency in comparison to raster operations performed by the GPU 110. This is due to both the higher data transfer bandwidth of the system memory bus 121 and the shorter communications path (e.g., lower data access latency) between the fragment processor 201 and the graphics data 116 within the system memory 115.

Performing a portion of the raster operations, or all of the raster operations, required for graphics rendering in the fragment processor 201 reduces the amount of graphics data accesses (e.g., both reads and writes) that must be performed by the GPU 110. For example, by implementing fragment operations within the fragment processor 201, accesses to fragment data (e.g., graphics data 116) required for iterating fragment colors across multiple pixels can be performed across the high bandwidth system memory bus 121. For example, fragment data can be accessed, iterated across multiple pixels, and the resulting pixel color values can be stored back into the system memory 115 all across the high bandwidth system memory bus 121. The interpolation and iteration functions can be executed by the fragment processor 201 in conjunction with an internal RAM 215. Such fragment processing operations comprise a significant portion of the rendering accesses to the graphics data 116. Implementing them using a fragment processor within the bridge will effectively remove such traffic from the low bandwidth graphics bus 120.

In one embodiment, the fragment processor 201 substantially replaces the functionality of the fragment processor 205 within the GPU 110. In this manner, the incorporation of the fragment processor 201 renders the fragment processor 205 within the GPU 110 optional. For example, in one embodiment, the GPU 110 is an off-the-shelf card-based GPU that is detachably connected to the computer system 100 via a graphics bus interconnect slot (e.g., AGP slot, PCI Express slot, etc.). Such an off-the-shelf card-based GPU would typically incorporate its own one or more fragment processors for use in those systems having a conventional prior art type bridge. The graphics bus interconnect can be an AGP-based interconnect or a PCI Express-based interconnect. The GPU 110 can be an add-in card-based GPU or can be a discrete integrated circuit device mounted (e.g., surface mounted, etc.) on the same printed circuit board (e.g., motherboard) as the bridge 105. When connected to the bridge 105 of the computer system 100 embodiment, the included fragment processor(s) can be disabled (e.g., by the graphics driver).

Alternatively, the GPU 110 can be configured specifically for use with a bridge component having an internal fragment processor (e.g., fragment processor 201). Such a configuration provides advantages in that the GPU integrated circuit die area that would otherwise be dedicated to an internal fragment processor can be saved (e.g., thereby reducing GPU costs) or used for other purposes. In this manner, the inclusion of a fragment processor 205 within the GPU 110 is optional.

In one embodiment, the internal fragment processor 205 within the GPU 110 can be used by the graphics driver in conjunction with the fragment processor 201 within the bridge 105 to implement concurrent raster operations within both components. In such an embodiment, the graphics driver would allocate some portion of fragment processing to the fragment processor 201 and the remainder to the fragment processor 205. The graphics driver would balance the processing workloads between the bridge component 105 and the GPU 110 to best utilize the high bandwidth low latency connection of the bridge component 105 to the system memory 115. For example, to best utilize the high bandwidth system memory bus 121, it would be preferable to implement as large a share as possible of the fragment processing workloads within the bridge component 105 (e.g., fragment processor 201). This would ensure as large a percentage of the fragment operations as is practical are implemented using the low latency high bandwidth system memory bus 121. The remaining fragment processing workloads would be allocated to the fragment processor 205 of the GPU 110.

Implementing fragment processing operations within the bridge component 105 provides an additional benefit in that the amount of integrated circuit die area within the GPU 110 that must be dedicated to "bookkeeping" can be reduced. Bookkeeping logic is used by conventional GPUs to keep track of accesses to the graphics data 116 that are "in-flight". Such in-flight data accesses are used to hide the latency the GPU 110 experiences when reading or writing to the graphics data 116 across the low bandwidth graphics bus 120. In general, in-flight data accesses refer to a queued number of data reads or data writes that are issued to the graphics data 116 that have been initiated, but whose results have yet to be received.

Bookkeeping logic is used to keep track of such in-flight accesses and, for example, to make sure storage is on hand when read results from the graphics data 116 arrive and to ensure the graphics data 116 is not corrupted when multiple writes have been issued. The more complex the bookkeeping logic, the more in-flight data accesses the GPU can maintain, and thus, the more the effects of the high latency can be hidden. By offloading fragment processing operations to the bridge 105 (e.g., fragment processor 201), the demands placed on any bookkeeping logic within the GPU 110 is reduced.

In this manner, embodiments of the present invention implement a much more efficient use of the limited data transfer bandwidth of the graphics bus interconnect, and thus greatly improves overall graphics rendering performance in comparison to the prior art architectures. Furthermore, the benefits provided by the embodiments of the present invention are even more evident in those architectures which primarily utilize system memory for frame buffer graphics data storage.

Figure 3:
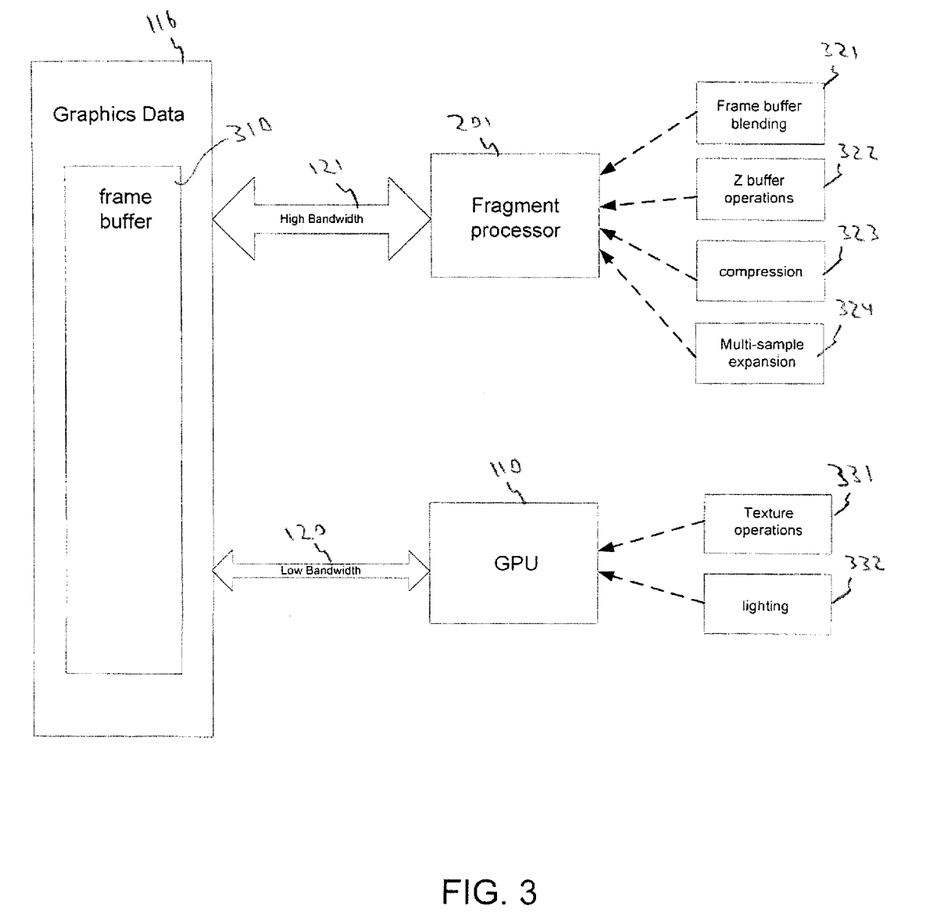
FIG. 3 shows a diagram depicting fragment processing operations executed by the fragment processor and the rendering operations executed by the GPU within a cooperative graphics rendering process in accordance with one embodiment of the present invention.

FIG. 3 shows a diagram depicting fragment processing operations executed by the fragment processor 201 and the rendering operations executed by the GPU 110 within a cooperative graphics rendering process in accordance with one embodiment of the present invention. As depicted in FIG. 3, the fragment processor 201 implements its accesses to the frame buffer 310 via the high bandwidth system bus 121. The GPU 110 implements its accesses to the frame buffer 310 via the low bandwidth graphics bus 120.

The FIG. 3 embodiment shows the functions included within the fragment processor 201. As shown in FIG. 3, the fragment processor includes those raster operations such as frame buffer blending 321 and Z buffer operations, and other operations such as compression, and multi-sample expansion. For example, the frame buffer blending module 321 blends fragment colors into the pixel data of the frame buffer 310. Generally, this involves interpolating existing pixel colors with fragment colors and iterating those resulting values across the multiple pixels of a polygon. Such frame buffer blending involves a large number of reads and writes to the frame buffer 310 and thus directly benefits from the high bandwidth and low latency afforded by the system memory bus 121.

The Z buffer blending module 322 evaluates depth information per fragment of a polygon and iterates the resulting depth information across the multiple pixels. As with color blending, Z buffer blending involves a large number of reads and writes to the frame buffer 310 and similarly benefits from the high bandwidth and low latency of the system memory bus 121.

In one embodiment, the fragment processor 201 is configured to use a Z plane equation coverage value to iterate depth information across multiple pixels of a polygon. In such an embodiment, the depth and orientation of a polygon in 3-D space is defined using a Z plane equation. The Z plane equation is used by the fragment processor 201 to determine depth information for each constituent pixel covered by the polygon, and is a much more compact method of describing depth information for a polygon than by using a list of Z values for each fragment of the polygon. Additional description of Z plane raster operations can be found in commonly assigned U.S. Patent Application "Z PLANE ROP" by Steve Molnar, filed on Jun. 28, 2004, Ser. No. 10/878,460, which is incorporated herein in its entirety.

The compression module 323 compresses and decompresses per pixel data for storage and retrieval from the frame buffer 310. For example, in some rendering operations a given pixel can have multiple value samples, with a number of bits per sample. For example, in a case where each pixel of a display includes 8 sample points, the compression module 323 would compress/decompress the data describing such sample points for easier access to and from the frame buffer 310.

The multi sample expansion module 324 performs multi sample expansion operations on the fragment data. For example, depending upon the application (e.g., anti-aliasing) the sample expansion module 324 can expand sample information from one sample point per pixel into eight sample points per pixel. Thus it is desirable to perform the sample expansion in the fragment processor 201 for storage into the frame buffer 310 as supposed to the GPU 110.

Referring still to FIG. 3, in the present embodiment, texture operations and lighting operations are still performed by the GPU 110 (e.g., module 331 and module 332). The texture operations and lighting operations can proceed much more quickly since the relatively limited bandwidth of the graphics bus 120 is free from the traffic that has been moved to the fragment processor 201.

Figure 4:
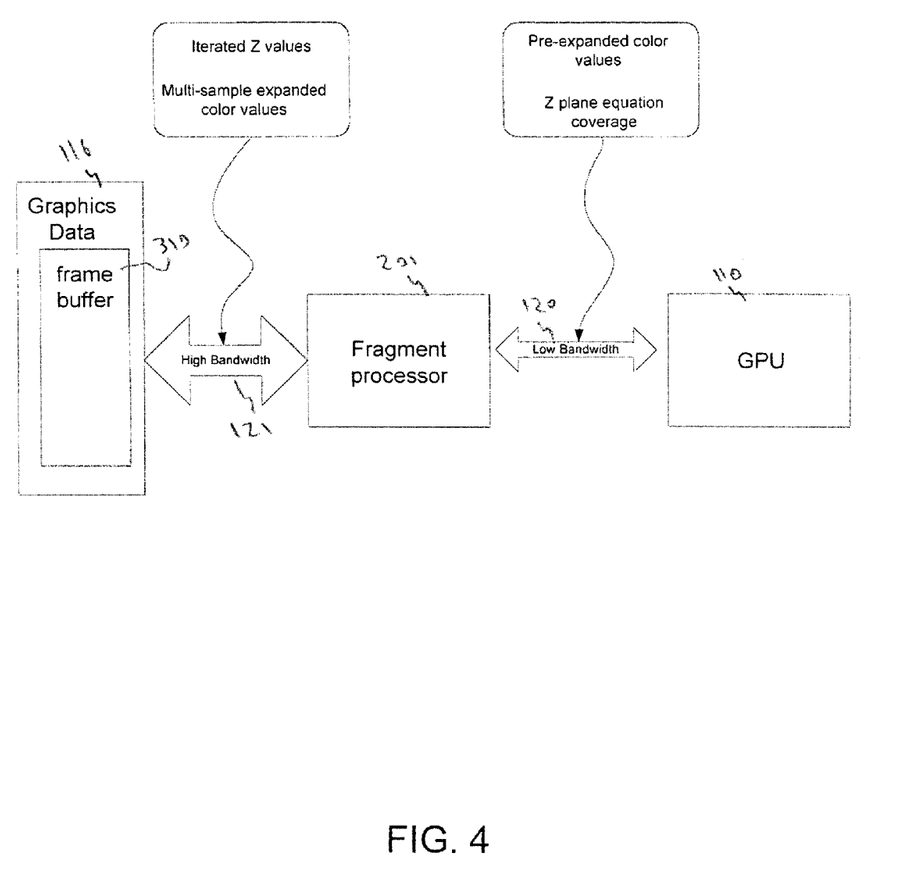
FIG. 4 shows a diagram depicting information that is transferred from the GPU to the fragment processor and to the frame buffer in accordance with one embodiment of the present invention.

FIG. 4 shows a diagram depicting information that is transferred from the GPU 110 to the fragment processor 201 and to the frame buffer 310 in accordance with one embodiment of the present invention. FIG. 4 shows a case illustrating the benefits by using the fragment processor 201 to perform Z value iteration and multi sample color expansion in accordance with one embodiment of the present invention. As shown in FIG. 4, the GPU 110 can be configured to transfer pre-expanded color values and Z plane equation coverage values to the fragment processor 201 for iteration and expansion. This results in a very compact transfer of data across the low bandwidth graphics bus 120 to the fragment processor 201.

For example, as opposed to sending individual pixels and their values, the GPU 110 sends fragments to the fragment processor 201. These fragments are pre-expanded. The fragments undergo multi sample expansion within the fragment processor 201. Multi sample expansion is used in applications involving anti-aliasing and the like. A typical multi sampling expansion would take one sample of one fragment and expanded it into four samples (e.g., 4× anti-aliasing) or eight samples (e.g., 8× anti-aliasing). This much larger quantity of data is then transferred to the frame buffer 310 across the high bandwidth system memory bus 121 as opposed to the low bandwidth graphics bus 120. For example, in a typical anti-aliasing application, a given pixel can be expanded from one sample comprising 32 bits into eight samples comprising 32 bits each.

Similarly, the Z plane equation can be expanded into 4×, 8×, etc. samples per pixel by the fragment processor 201 from the plane equation for the original polygon. The resulting expanded Z data is then transferred from the fragment processor 201 across the high bandwidth system memory bus 121 to the frame buffer 310.

Figure 5:
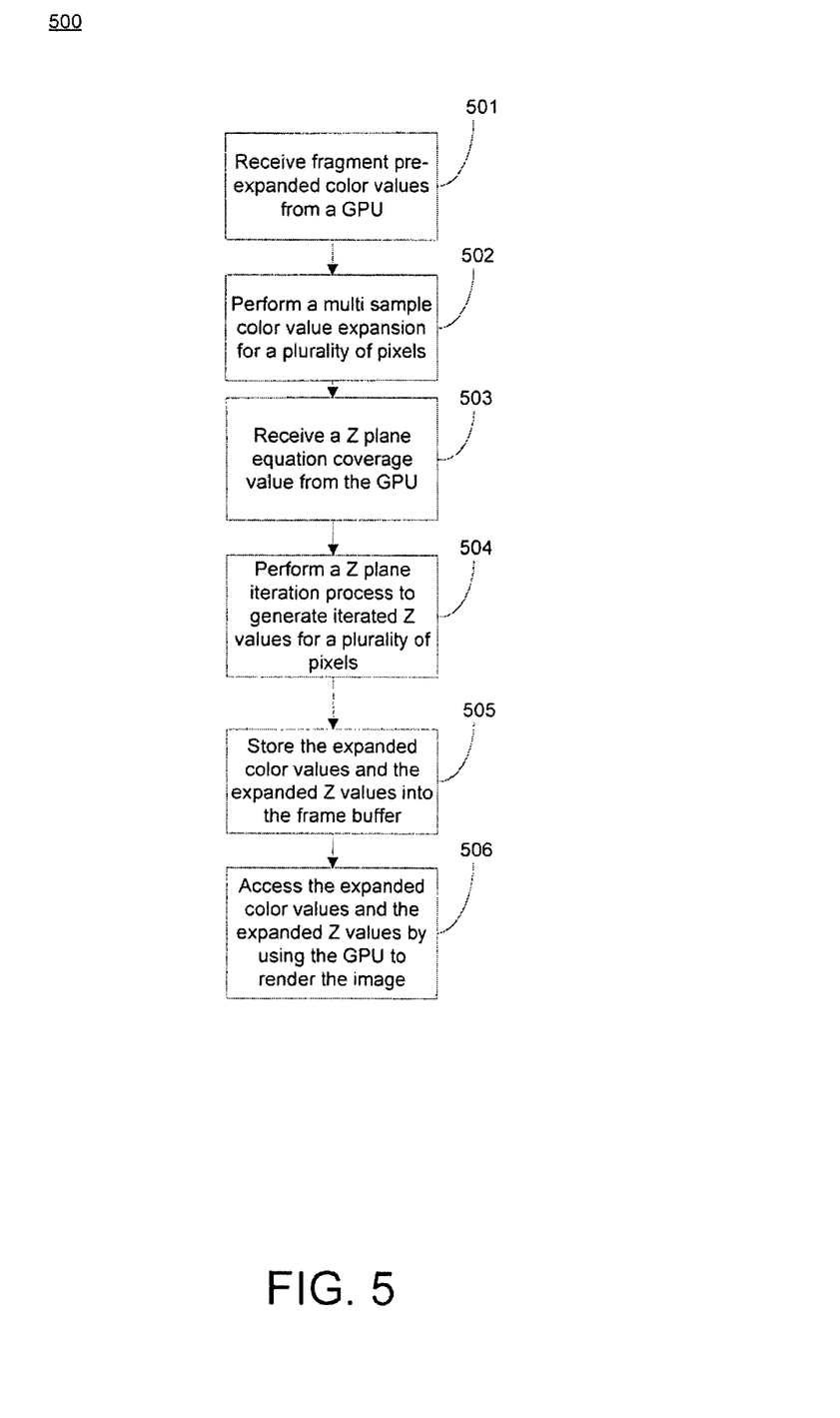
FIG. 5 shows a flowchart of the steps of a cooperative graphics rendering process in accordance with one embodiment of the present invention.

FIG. 5 shows a flowchart of the steps of a cooperative graphics rendering process 500 in accordance with one embodiment of the present invention. As depicted in FIG. 5, process 500 shows the basic steps involved in a cooperative graphics rendering process as implemented by a fragment processor (e.g., fragment processor 201) of a bridge (e.g., bridge of 105) and the GPU (e.g., GPU 110) of a computer system (e.g., computer system 100 of FIG. 2).

Process 500 begins in step 501, where the fragment processor 201 receives fragment pre-expanded color values from the GPU 110 via the graphics bus 120. In step 502, the fragment processor 201 performs a multi sample color value expansion for a plurality of pixels. In step 503, the fragment processor 201 receives a Z plane equation coverage value from the GPU 110. In step 504, the fragment processor 201 performs a Z plane iteration process to generate iterated Z values for a plurality of pixels. In step 505, as described above, the fragment processor 201 stores the resulting expanded color values and the resulting expanded Z values into the frame buffer 310 via the high bandwidth system memory bus 121. Subsequently, in step 506, the GPU 110 accesses the expanded color values and expanded Z values to render the image.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A system for cooperative graphics processing across a graphics bus comprising:
   a computer system comprising:
      a system memory;
      a graphics bus;
      a system memory bus,
      a graphics processor coupled to the graphics bus; and
      a bridge comprising a fragment processor, the bridge being coupled to the system memory via the system memory bus, and to the graphics processor via the graphics bus,
   wherein, the graphics processor and fragment processor are configured to perform a plurality of fragment processing operations cooperatively,
   wherein a graphics driver executing on the computer system balances the plurality of fragment processing operations between the fragment processor and the graphics processor by allocating at least a portion of the plurality of fragment processing to the fragment processor to be performed and allocating a remaining portion of the plurality of fragment processing operations to the graphics processor to be performed,
   further wherein, the system memory bus has a greater bandwidth than the graphics bus.

2. The system of claim 1, wherein the plurality of fragment processing operations comprises a plurality of raster operations on graphics data stored in the system memory.

3. The system of claim 1, wherein the graphics data stored in the system memory comprises a frame buffer used by the fragment processor and the graphics processor.

4. The system of claim 1, wherein the plurality of fragment processing operations comprises frame buffer blending on the graphics data in the system memory.

5. The system of claim 1, wherein the plurality of fragment processing operations comprises multi-sample expansion on graphics data received from the graphics processor and store resulting expanded data in the system memory.

6. The system of claim 1, wherein the plurality of fragment processing operations comprises evaluating a Z-plane equation coverage value for a plurality of pixels stored in the system memory, wherein the Z-plane equation coverage value is received from the graphics processor.

7. The system of claim 1, wherein the bridge is a North bridge chipset component of the computer system.

8. The system of claim 1, wherein the graphics processor is configured to use a portion of the system memory for frame buffer memory.

9. The system of claim 1, wherein the graphics processor is detachably coupled to the graphics bus by a connector.

10. The system of claim 1, wherein the graphics bus is an AGP graphics bus.

11. The system of claim 1, wherein the graphics bus is a PCI Express graphics bus.

12. The system of claim 1, wherein the graphics driver balances the plurality of fragment processing operations between the fragment processor and the graphics processor by allocating as large a share as possible of the plurality of fragment processing operations to the fragment processor.

13. The system of claim 1, wherein the system memory is used as frame buffer memory for the computer system.

14. The system of claim 1, wherein an amount of data access latency experienced by performing fragment processing operations in the fragment processor is reduced relative to an amount of data access latency experienced by performing the fragment processing operations in the graphics processor.

15. A bridge for implementing cooperative graphics processing with a graphics processor coupled to the bridge across a graphics bus comprising:
   a computer system comprising:
      a system memory bus interface comprising a system memory bus;
      a graphics bus interface comprising a graphics bus; and
      a fragment processor disposed in the bridge coupled to the system memory bus, the fragment processor being configured to perform a plurality of fragment processing operations cooperatively with a graphics processor coupled to the graphics bus,
   wherein, a graphics driver executing on the computer system balances the plurality of fragment processing operations between the fragment processor and the graphics processor by allocating at least a portion of the plurality of fragment processing operations to the fragment processor to be performed and allocating a remaining portion of the plurality of fragment processing operations to the graphics processor to be performed,
   further wherein, the system memory bus has a greater bandwidth than the graphics bus.

16. The bridge of claim 15, wherein the plurality of fragment processing operations comprises a plurality of raster operations on graphics data stored in the system memory.

17. The system of claim 15, wherein the bridge is configured to use a frame buffer in the system memory for the processing of graphics data.

18. The system of claim 15, wherein the plurality of fragment processing operations comprises frame buffer blending on the graphics data in the system memory.

19. The system of claim 15, wherein the plurality of fragment processing operations comprises multi-sample expansion on graphics data received from the graphics processor and store resulting expanded data in the system memory.

20. The system of claim 15 wherein the plurality of fragment processing operations comprises evaluating a Z plane equation coverage value for a plurality of pixels stored in the system memory, wherein the Z plane equation coverage value is received from the graphics processor.

21. The system of claim 15, wherein the graphics processor is detachably coupled to the graphics bus by a connector.

22. The system of claim 15, wherein the graphics driver balances the plurality of fragment processing operations between the fragment processor and the graphics processor by allocating as large a share as possible of the plurality of fragment processing operations to the fragment processor.

23. The system of claim 15, wherein the system memory bus is coupled to a system memory, and wherein the system memory is used as frame buffer memory for the computer system.

24. In a bridge of a computer system, a method for cooperatively implementing fragment processing operations with a graphics processor across a graphics bus in a computer system, comprising:
   in a computer system, receiving at a fragment processor pre-expanded color values from the graphics processor via the graphics bus, the fragment processor, graphics processor and graphics bus being disposed in the computer system;
   performing a multi-sample expansion on the color values resulting in expanded color value graphics data, the multi-sample expansion comprising at least a portion of the fragment processing to be performed cooperatively by the fragment processor and the graphics processor in the computer system across the graphics bus;

storing the expanded color value graphics data into a frame buffer in a system memory through a system memory bus; and rendering an image to a display, the rendering performed by the graphics processor accessing the expanded color value graphics data in the frame buffer, wherein, the multi-sample expansion is balanced by a graphics driver executing on the computer system by allocating the portion of the fragment processing to the fragment processor to be performed and allocating a remaining portion of the fragment processing to be performed cooperatively to the graphics processor to be performed, further wherein, the system memory bus has a greater bandwidth than the graphics bus.

25. The method of claim 24, further comprising:

receiving Z plane equation coverage values from the graphics processor via the graphics bus;

performing a Z plane iteration process to generate iterated Z values for a plurality of pixels;

storing the iterated Z values into the frame buffer; and rendering the image to the display, the rendering performed by the graphics processor accessing the iterated Z values in the frame buffer.

26. The method of claim 24, wherein the bridge is a North bridge chipset component of the computer system.

27. The method of claim 26, wherein the graphics processor is detachably coupled to the graphics bus by a connector.

28. The method of claim 27, wherein the graphics bus is an AGP graphics bus.

29. The method of claim 27, wherein the graphics bus is a PCI Express graphics bus.

30. The method of claim 24, wherein the graphics driver balances the plurality of fragment processing operations between the fragment processor and the graphics processor by allocating as large a share as possible of the plurality of fragment processing operations to the fragment processor.

31. The method of claim 24, wherein the system memory is used as frame buffer memory for the computer system.

* * * * *